United States Patent
Yang et al.

(10) Patent No.: US 7,407,998 B2
(45) Date of Patent: *Aug. 5, 2008

(54) STABILIZED UV TRANSPARENT ACRYLIC COMPOSITION

(75) Inventors: Shi-Jun Yang, Upper Dublin, PA (US); Richard Abel, Bensalem, PA (US)

(73) Assignee: Arkema France, Colombes (FR)

( * ) Notice: Subject to any disclaimer, the term of this patent is extended or adjusted under 35 U.S.C. 154(b) by 358 days.

This patent is subject to a terminal disclaimer.

(21) Appl. No.: 11/205,425

(22) Filed: Aug. 17, 2005

(65) Prior Publication Data

US 2006/0069189 A1 Mar. 30, 2006

Related U.S. Application Data

(63) Continuation-in-part of application No. 10/951,849, filed on Sep. 28, 2004.

(60) Provisional application No. 60/649,462, filed on Feb. 2, 2005.

(51) Int. Cl.
*C08K 5/09* (2006.01)
(52) U.S. Cl. .................... 524/320; 524/300
(58) Field of Classification Search ........... 524/99–100, 524/300, 320
See application file for complete search history.

(56) References Cited

U.S. PATENT DOCUMENTS

| | | | |
|---|---|---|---|
| 3,890,267 A | 6/1975 | Fukushima et al. | |
| 4,049,503 A | 9/1977 | Becker et al. | |
| 4,183,991 A * | 1/1980 | Smiley et al. | ......... 524/35 |
| 4,346,144 A | 8/1982 | Craven | |
| 4,550,136 A | 10/1985 | Hosch | |
| 4,793,668 A | 12/1988 | Longstaff | |
| 4,798,427 A | 1/1989 | Sear | |
| 5,061,747 A | 10/1991 | Roach et al. | |
| 5,169,903 A | 12/1992 | Toritani et al. | |
| 5,258,423 A | 11/1993 | Crabb et al. | |
| 5,306,746 A * | 4/1994 | Ida et al. | ......... 523/206 |
| 5,444,809 A | 8/1995 | Aoki et al. | |
| 5,466,756 A | 11/1995 | Roach et al. | |
| 6,716,950 B2 | 4/2004 | Servaty et al. | |
| 6,883,938 B1 | 4/2005 | Kohara et al. | |
| 2002/0052460 A1 | 5/2002 | Servaty et al. | |

* cited by examiner

*Primary Examiner*—Peter Szekely
(74) *Attorney, Agent, or Firm*—Thomas F. Roland

(57) ABSTRACT

This invention relates to a UV stabilized transparent acrylic composition. More specifically the acrylic composition is stabilized with a carboxylic acid compound, which prevents or delays deterioration of the acrylic composition from high intensity UV radiation. The carboxylic acid compound is preferably an alpha hydroxylcarboxylic acid compound. The delay or prevention of deterioration results in the transmission of more UV radiation through the acrylic composition for longer periods of time. The composition is especially useful for tanning and other applications requiring transmission of high levels of UV radiation and resistance to discoloration. It is also useful in optical cable, LCD displays, acrylic storage media, and in HID devices.

19 Claims, 1 Drawing Sheet

UV transmission% at 300nm for Plexiglas G-UVT and various commercial UVT samples as a function of UVB exposure (Test method: ASTM-G154)

STABILIZED UV TRANSPARENT ACRYLIC COMPOSITION

This application is a continuation in part of U.S. patent application Ser. No. 10/951,849, filed Sep. 28, 2004, from which priority id claimed. This application also claims benefit, under U.S.C. §119(e) of U.S. Provisional Application No. 60/649,462, filed Feb. 2, 2005.

FIELD OF THE INVENTION

This invention relates to a UV stabilized transparent acrylic composition. More specifically the acrylic composition is stabilized with a carboxylic acid compound, which prevents or delays deterioration of the acrylic composition from high intensity UV radiation. The delay or prevention of deterioration results in the transmission of more UV radiation through the acrylic composition for longer periods of time. The composition is especially useful for tanning beds and other applications requiring transmission of high levels of UV radiation and resistance to discoloration. It is also useful in optical cable, LCD displays, acrylic storage media, and in HID devices.

BACKGROUND OF THE INVENTION

The use of UV transmitting acrylics has been growing each year, as a result of indoor tanning trends. The tanning operation requires a certain amount of UVB radiation (280-320 nm) to be transmitted through the acrylic sheet for effective skin tanning. The output of UV rays from a tanning lamp has been increasing to accommodate the consumer's needs for faster tanning, which adversely shortens the service life of commercial UV transparent acrylic sheet. Acrylics have been used to cover the UV lamps, since they are easy to care for, easy to fabricate, and they are one of the very few thermoplastic materials that can transmit a high percentage of the UV radiation below 300 nm region. For tanning beds, the acrylic sheet composition needs to have high UV transmission of at least 75% and preferably at least 80%, retention of UV transmission under high UV radiation, and chemical resistance. The historic problem with acrylics is that it is difficult to retain high UV transparency and clarity under strong UV radiation. The acrylic products will gradually lose their UV transmission and develop yellowness after exposing to strong UV radiation.

Several additives have been employed to stabilize acrylic compositions and retain UV transmittance.

U.S. Pat. No. 5,466,756 describes the use of an aliphatic alcohol and a high boiling hydroxyl compound in polymethylmethacrylate to improve the UV radiation resistance of the polymer.

Hindered amine light stabilizers (HALS) are described in U.S. Pat. No. 4,550,136. U.S. Pat. No. 6,716,950, and U.S. 2002/0052460 describe hindered amine light stabilizers (HALS) in combination with an additional active compound for the stabilization of acrylic resin against UV radiation. The active compounds include alcohols, water, vinyl esters, siloxanes and butyl lactate.

There is a need for acrylic composition UV stabilizers having better UV retention.

Surprisingly it has been found that the addition of a carboxylic acid compound as a UV stabilizer, and in particular an alpha-hydroxy acid compound, provides better UV stabilization to an acrylic composition than currently used stabilizers. Acrylic samples stabilized with lactic acid showed almost no loss of UV transmission and little yellowing after 3000 hours of UVB radiation, while acrylics stabilized with known stabilizers showed UV transmission losses of up to 80% of their original UV transmission.

SUMMARY OF THE INVENTION

It is an object of the invention to provide a stabilized, UV transparent acrylic composition that resists deterioration from UV radiation and retains a high level of UV transmission.

It is a further object of the invention to provide an acrylic composition that retains its UV transmission well under UVC, UVB, UVA, Carbon Arc, Xenon Arc, and HID radiation at elevated temperature for extended time.

Another object of the invention is to provide acrylic sheet useful in tanning beds having a high level of both UV transmission and UV transmission retention.

A further objective is to provide a composition and process for stabilized high UV transmission acrylic sheet resulting in an acrylic sheet having very low levels of compounds which can decompose or react under high UV radiation to form products that reduce UV transmission, and/or increase yellowing.

The objectives of the invention are achieved, in accordance with the principles of a preferred embodiment of the invention, with a stabilized high UV transmission acrylic polymer composition comprising:
a) 90 to 99.9 percent by weight of an acrylic polymer or copolymer; and
b) 0.1 to 10 percent by weight of one or more carboxylic acid compounds as a UV stabilizer.

DETAILED DESCRIPTION OF THE INVENTION

Figure 1:
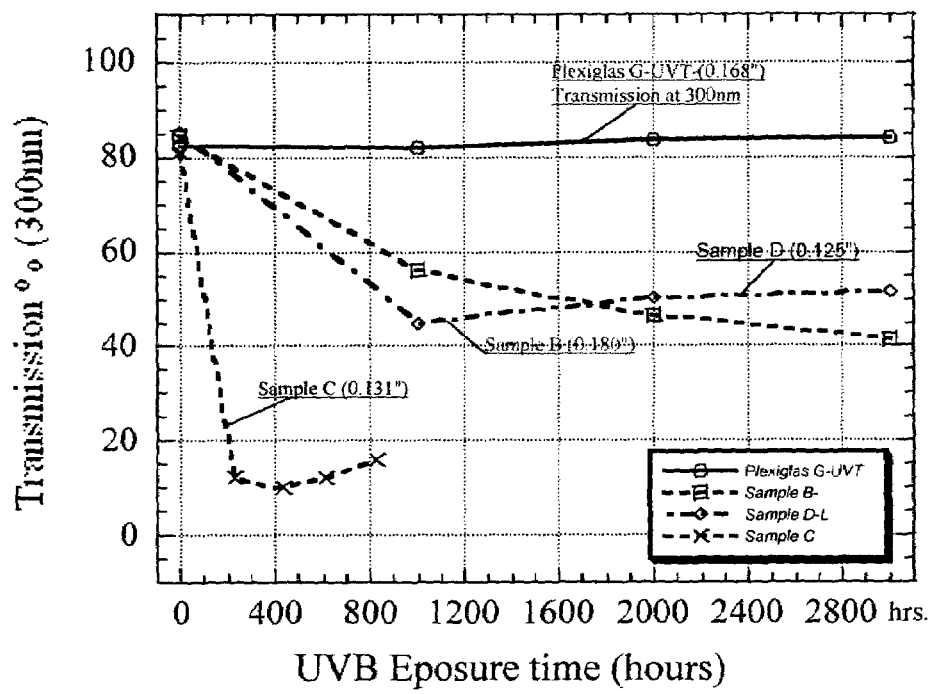
FIG. 1. Shows the change in UV transmission for the composition made by the invention and commercial UV transparent materials. The composition of the invention demonstrates a much better retention of UV transmission.

The invention relates to a UV transparent stabilized acrylic polymer composition, having a high level of UV transmission and UV transmission retention. The composition is very effective in retaining its UV transmission under high environmental temperature.

By UV radiation, as used herein is meant radiation having a wavelength of 380 nm or shorter, or a light source that contains a certain portion of UV radiation that has a wavelength shorter than 380 nm.

The acrylic polymer composition of the present invention includes polymers, copolymers and terpolymers formed from alkyl methacrylate and alkyl acrylate monomers, and mixtures thereof. The alkyl methacrylate monomer is preferably methyl methacrylate, which may make up from 60 to 100 of the monomer mixture. 0 to 40 percent of other acrylate and methacrylate monomers may also be present in the monomer mixture. Other methacrylate and acrylate monomers useful in the monomer mixture include, but are not is limited to methyl acrylate, ethyl acrylate and ethyl methacrylate, butyl acrylate and butyl methacrylate, iso-octyl methacrylate and acrylate, lauryl acrylate and lauryl methacrylate, stearyl acrylate and stearyl methacrylate, isobornyl acrylate and methacrylate, methoxy ethyl acrylate and methacrylate, 2-ethoxy ethyl acrylate and methacrylate, dimethylamino ethyl acrylate and methacrylate monomers etc. Alkyl (meth) acrylic acids such as methyl acrylic acid and acrylic acid can be useful for the monomer mixture. Small levels of multifunctional monomers as crosslinking agents may also be used. Suitable crosslinking monomers include but are not limit to, for example, allyl methacrylate, allyl acrylate, divinylbenzene, ethylene glycol dimethacrylate and diacrylate, ethylene glycol triacrylate and trimethacrylate, butylene glycol dimethacrylate, glycidyl methacrylate, triallyl isocyanurate, N-hydroxymethyl acrylamide, N,N-methylene diacrylamide and dimethacrylamide, triallyl citrate, trimethylolpropane triacylate, trimethylolpropane trimethacrylate, diethyleneglycol divinyl ether, etc.

In one embodiment, the acrylic polymer is a copolymer of from 85 to 95 weight percent methyl methacrylate and from 5 to 15 weight percent methyl acrylate. This composition was found to be especially resistant to yellowing under high UV radiation exposure.

The molecular weight of the acrylic polymer is generally between 100,000 and 3,000,000. The lower molecular weight materials made by an extrusion process are generally less expensive to produce. Higher molecular weight acrylic polymers tend to be more expensive to produce, but have added benefits such as excellent scratch and chemical resistance.

In one embodiment of the invention, high purity monomers are used in the polymerization. This results in polymer compositions having a high initial UV transmission.

The UV stabilizer used in the invention is a carboxylic acid compound. By carboxylic acid compound, as used herein, is meant both the carboxylic acid itself, and the neutralized or partially neutralized acid. Carboxylic acids may be neutralized by mineral bases or organic bases. In one embodiment, the carboxylic acid is neutralized with an anime. The amine could be a hindered amine, which itself may provide some UV stability to the acrylic polymer.

Carboxylic acids useful as stabilizers in the present invention include, but are not limited to, formic, acetic, propionic, butyric, valeric, caproic, caprylic, capric, lauric, myristic, palmitic, stearic, oleic, linoleic, linolenic, cyclohexanecarboxylic, phenyl acetic, benzoic, toluic, chlorobenzoic, bromobenzoic, nitrobenzoic, salicylic, hydroxybenzoic, anthranilic, and aminobenzoic acids.

Dicarboxylic acids including, but not limited to lactic, oxalic, malonic, glutaric, adipic, maleic, fumeric, tartaric, and phthalic acids are also useful as UV stabilizers. Preferred carboxylic acid stabilizers are alpha-hydroxy acids. Preferred carboxylic acids are acetic, oxalic and lactic acids. Mixtures of carboxylic acids, and mixtures with other known stabilizers are also within the scope of the invention.

The UV stabilizer may be added at from 0.01 to 10.0 percent by weight, preferably from 0.05 to 5 percent by weight, and most preferably from 0.1 to 2.0 weight percent, based on the amount of polymer. The carboxylic acid compound can also be combined together with HALS, preferably at from 0.01 to 2.0 percent based on the total polymer to achieve good resistance to yellowness and loss of UV transmission. However, HALS alone could not retain the UV transmission of the samples exposed to UVB radiation.

The carboxylic acid compound stabilizer is added into the polymer matrix through melt processing methods such as extrusion compounding, melt blending and other methods known in the art. It can also be added into the monomer mixture directly, which is then polymerized through acrylic polymerization process such as bulk, suspension, emulsion, and continuous cast, cell cast, CFSTR (Continuous Flow Stirring Tank Reaction) processes, etc. Alpha hydroxylcarboxylic acid is stable under normal acrylic process conditions. In a preferred embodiment an alpha hydroxy acid which is stable under normal acrylic processing conditions is used as the stabilizer. It can be added into the resin composition as a liquid through a post polymerization process such as extrusion compounding and melt blending, or added directly into the monomer mix as a liquid through prepolymerization. Proper stirring is required to ensure adequate mixing through pre-polymerization addition.

The polymer composition may be formed into objects by means known in the art, such as molding, sheet extrusion, and cast sheet preparation. Pipe, cable, strands and other articles can be formed by extrusion. Standard thickness of sheets used in the tanning industry tend to be between 0.354 inch and 0.118 inch and preferably between 0.25 inch and 0.118 inch.

It is believed that extraneous non-acrylic compounds, or their decomposition or reaction products, in the acrylic polymer composition can serve to decrease the UV transmission and increase yellowing of the acrylic composition. It is preferred to select reactants, formulations, processing equipment, and storage containers in such a way as to minimize the level of compounds entering and remaining in the final composition that can lead to a decrease of UV transmission either initially or over time. These compounds could include intentionally added constituents of the formulation, such as initiators, plasticizers, surfactants, fillers, stabilizers, lubricants, colorants, pigments, and antioxidants. Preferably the acrylic composition contains less than 5000 ppm total of compounds that decrease the UV transmission, preferably less than 100 ppm, more preferably less than 10 ppm, more most preferably less than 1 ppm, more preferably less than 0.1 ppm, and most preferably less than 0.01 ppm. In a preferred embodiment, the total level of adipate, alkyl sulfonic ester, mercaptan, phthalate, succinate, and/or sulfonate is less than 5000 ppm, preferably less than 100 ppm, more preferably less than 10 ppm, more most preferably less than 1 ppm, more preferably less than 0.1 ppm, and most preferably less than 0.01 ppm. The UV-blocking non-acrylic compounds could enter the acrylic composition as impurities in any of the raw materials. For this reason it was earlier mentioned that the use of high purity monomers is a preferred embodiment of the invention. Likewise, impurities can enter the acrylic composition from processing equipment, such as migration of plasticizer or other contaminants from extruders, mixing tanks, agitators, spacers, transport lines, and molds. Equipment should be chosen to reduce the possibility of contamination of the UV composition with materials that would decrease UV transmission or UV transmission retention. This could be accomplished by choosing materials for process equipment having little extractibles, such as nylon, polyolefins such as polyethylene, polypropylene, and polybutylene, or poly(vinyl alcohol). It could also mean modifying common materials used in processing, such as plasticized poly(vinyl chloride (PVC), to reduce extractibles by means such as the use of polymeric plasticizers in PVC, use of plasticizers that do not negatively effect UV properties, or by coating or coextruding PVC with a non-plasticied polymer coating, such as poly(vinyl alcohol) or nylon.

The final acrylic composition must pass an accelerated UV deterioration test, in which the samples are placed inside a Q-Panel Accelerated Weathering tester, model QUV/SE, with UVB313EL lamps. The set point for the accelerated tester is 0.67 W/M$^2$ at the calibration wavelength (313 nm). The UV transmission is measured by a UV/V is spectrometer before and after the Q-UVB lamp exposures. The YI (yellowness index) of these samples are measured by a Machbeth Coloreye Colorimeter according to the ASTM E-313 before and after the Q-UVB exposures. The composition of the invention shows a UV transmission deterioration of less than 50%, preferably less than 25%, more preferably less than 15%, and most preferable less than 10% of its initial UV transmission after 240 hours of Q-UVB exposure.

It was found that the ability of the stabilizer of the invention to stabilize acrylic compositions was even more evident at higher exposure temperatures and higher intensity radiation levels. The stabilized composition works well at temperatures from ambient up to 93° C.

Formed articles made of the composition of the invention are useful in tanning beds; greenhouses; coverings for structures in which plants including grass are grown; shelters for animals; a terrarium; or an aquarium.

The composition of the invention may also be used in a device or system that allows for the transmission of UV energy for subsequent conversion to visible or alternative wavelength energy. It may also be used in devices or systems where UV energy is used to heat, cure, or react components—including chemical reactants, coatings, inks, and polymerizable components, and in which a component made from the UV transparent acrylic composition of the invention is between the UV energy source and the components to be heated, cured or reacted. The composition of the invention can serve as a barrier separating and protecting the UV source from the components to be heated, cured or reacted, such as in a clean room.

In one embodiment, the acrylic sheet has a frosted appearance, which tends to hide the sunbed lights, while still transmitting high levels of UV radiation.

Another application for the UV stabilized acrylic composition of the invention is in LCD displays and in data storage disks. There is a trend to move to shorter wavelength light sources for LCD devices. As the wavelength moves below the 380 nm level into the UV region, screens will need to be made of material resisting the yellowing caused by the UV radiation. The stabilized acrylic composition of the invention is useful in this application.

The stabilized acrylic composition is also useful for electronic devices where high UV/VIS transmission is required, such as digital versatile disk (DVD) and data storage devices, etc. The amount of data that can be stored on a disk is related to the wavelength of light being used to read the disk. In theory, as the wavelength used for reading data becomes shorter, data can be closer together. Thus with shorter wavelength radiation in the UV range, data density can be increased. Shorter wavelengths also result in higher resolution and better resistance to interference.

Another application for which the stabilized composition of the invention is useful is in optical fiber where UV radiation is part of the transmitted light radiation.

Still another application is in articles having a high intensity discharge (HID) light source. These light sources contain both visible and UV wavelength radiation at high intensity. This radiation would cause unstabilized acrylic compositions to degrade and discolor.

EXAMPLES

Examples 1-4

The preparation procedures for the examples 1, 2, 3 and 4 are as following: 100 g of MMA monomer was added into four separate clean containers, 0.1 g of stearic acid, 0.03 g of 2,2 Azobisisobutyronitrile, 0.04 g of Lupero®-70 were also added into each container. Lactic acid having a high purity was added 0.5 g for example 1, 0.75 g for example 2, 1.0 g for example 3. 1.0 g of butyl lactate (comparative) was added for example 4. The monomer mixture in each container was mixed thoroughly on a laboratory shaker. At least 15 minutes mixing time was provided before filling the glass cell.

The monomer mix from each container was then filled into glass cell sealed with a PVC spacer between the glass plates. The vacuum was applied to each container to remove air bubbles before and after filling the glass cells. Oxygen has been found to hinder the polymerization. The glass cell assemblies were placed into a water bath at 61° C. for about 9 hours; the glass cells were then transferred to an oven for curing at 82° C. for 4 hours, and at 125° C. for 3 hours to complete the polymerization cycle. The reaction was monitored by a digital temperature controller. The final sample thickness is about 0.170 inch. The residual monomers of these samples are ranging from 0.5%-0.7% respectively. The weight average molecular weight Mw for these samples are around 2,000,000. The initial UV transmission of the samples was measured on a PerkinElmer 850 model UV/VIS spectrometer, as shown in the table as 0 hours reading. The YI (yellow index) of these samples were also measured by a Macbeth Coloreye® 7000 calorimeter according to the ASTM D-1925 method before UVB lamp exposure. ASTM stands for American Standard Test Method. The samples were then placed inside a Q-Panel Accelerated Weathering Tester, model QUVISE, with UVB 313EL lamps. The set point for the accelerated weathering tester is 0.67 W/M$^2$ at the calibration wavelength ($\lambda$=313 nm). The chamber temperature of the Q-Panel Weathering Tester was monitored by a digital recorder. The samples of examples 1 through 4 were taken out of Q-Panel Accelerated Weathering Tester at a few hundreds hours intervals to evaluate their UV transmission at 300 nm using a Perkin Elmer 850 UV/VIS spectrometer. The YI of each sample was also measured at the same time. The example 3 which contains the same weight percent of lactic acid (1 g lactic acid in 100 g monomer) as the example 4 which contains butyl lactate showed better resistance to high level of UV and visible light radiation. The UV transmission and yellowness index of the example 3 had no or very minimum change after 3000 hours of UVB exposure. The example 4, which contains 1 g of butyl lactate per 100 g monomer, showed noticeable change in both UV transmission and yellowness after a few hundreds hours of UVB exposure. The results are shown in Table 1 below.

TABLE 1

| Q-UVB Exposure | Example 1 LAC-0.5% | | Example 2 LAC-0.75% | | Example 3 LAC-1.0% | | Example 4 BL-1.0% | |
|---|---|---|---|---|---|---|---|---|
| Transmission at | 300 nm | YI | 300 nm | YI | 300 nm | YI | 300 nm | YI |
| 0 hours (initial T %) | 78% | 0.6 | 79% | 0.6 | 81% | 0.5 | 79% | 0.6 |
| 200 hours | 54% | 2.8 | 65% | 2.0 | 79% | 1.0 | 52% | 3.4 |
| 400 hours | 63% | 1.9 | 72% | 1.5 | 81% | 0.9 | 66% | 2.2 |
| 600 hours | 68% | 1.7 | 76% | 1.3 | 80% | 0.9 | 69% | 2.0 |
| 3000 hours | 70% | 1.6 | 79% | 1.2 | 81% | 0.9 | 75% | 1.6 |

Examples 5-7 (Comparative Examples)

Sample preparation procedures for the examples 5, 6, and 7 are similar to the ones described in examples 1. To each of three clean glass containers, 100 g of methyl methacrylate monomer, 0.04 g of 2,2 Azobisisobutyronitrile, 0.01 g of terpinolene, 0.1 g of stearic acid were added and mixed. To each of the three mixtures, 0.6 g, 1.0 g and 1.2 g of butyl lactate were added separately and mixed on a lab shaker for about 25 min. The resulting compositions of examples 5, 6, and 7 contain 0.6%, 1.0%, and 1.2% butyl lactate respectively. The vacuum was applied to the monomer mixtures after mixing to remove air bubbles. The monomer mix was then filled into a glass cell sealed with a spacer and heated at 61° C. for 9 hours, 78° C. for 3 hours, 85° C. for 2 hours, and 125° C. for 3 hours. The UVB weathering test of examples 5, 6, and 7 was done the same way as described in previous section. The example 7 which contains about 1.2% butyl lactate provides best resistance to UV transmission loss and yellowing. The examples 5, 6, and 7 revealed that the butyl lactate is not as effective as lactic acid for the UV light stabilization of acrylic polymer.

The results are shown in Table 2 below.

TABLE 2

| Q-UVB Exposure | Example 5 | | Example 6 | | Example 7 | |
|---|---|---|---|---|---|---|
| Transmission at | 300 nm | YI | 300 nm | YI | 300 nm | YI |
| 0 hours (initial T %) | 72% | 0.6 | 72% | 0.6 | 66% | 0.5 |
| 200 hours | 27% | 4.0 | 48% | 3.4 | 48% | 2.8 |
| 400 hours | 35% | 6.3 | 60% | 2.2 | 58% | 2.0 |
| 600 hours | 40% | N/A | 63% | 2.0 | 64% | N/A |
| 800 hours | 44% | 4.3 | 68% | 1.7 | 69% | 1.7 |

Examples 8-10 (Comparative)

Acetic Acid

The samples of example 8, 9, and 10 were made by similar procedures as disclosed in example 1. The compositions of 100.0 g of methyl methacrylate monomer, 0.10 g of stearic acid, 0.03 g of Luperox®-11, 0.04 g of Luperox®-70 were prepared in three separate clean containers and mixed thoroughly on a laboratory shaker. To each of the containers, 0.5 g (as example 8), 1.0 g (as example 9), and 1.2 g (as example 10) of acetic acid were added and mixed by a shaker. The monomer mixtures were then heated at 61° C. for 9 hours, 82° C. for 4 hours, and 125° C. for 3 hours. The samples were then exposed to a Q-UVB Accelerated Weathering Tester of Q-Panel Lab Products using UVB 313EL type lamp. The UV transmission at 300-nm and yellowness index number was measured every 200-hours intervals. The results were listed in the following table. The example 10 which contains about 1.2% acetic acid, showed some effect on UV stabilization. The results are shown in Table 3 below.

TABLE 3

| Q-UVB Exposure | Example 8 | | Example 9 | | Example 10 | |
|---|---|---|---|---|---|---|
| Transmission at | 300 nm | YI | 300 nm | YI | 300 nm | YI |
| 0 hours (initial T %) | 74% | 0.6 | 72% | 0.6 | 73% | 0.6 |

TABLE 3-continued

| Q-UVB Exposure | Example 8 | | Example 9 | | Example 10 | |
|---|---|---|---|---|---|---|
| Transmission at | 300 nm | YI | 300 nm | YI | 300 nm | YI |
| 200 hours | 22% | 8.4 | 20% | 8.3 | 25% | 7.9 |
| 400 hours | 22% | 9.8 | 25% | 8.1 | 27% | 6.9 |
| 800 hours | 31% | 8.3 | 31% | 7.0 | 38% | 5.9 |
| 1000 hours | 32% | 8.0 | 35% | 6.8 | 40% | 5.7 |

Examples 11-15

Mixtures of Lactic Acid and Hindered Amine Light Stabilizers (HALS)

The combination of lactic acid and Tinuvin® 770, a hindered amine light stabilizer (HALS), also showed good resistance to yellowing and UV radiation. However, the HALS alone even at a relatively high concentration could not provide protection for UV radiation, as revealed in example 13, 14, and 15. The example 11 contains 90% methyl methacrylate, 10% methyl acrylate, 0.10% stearic acid, 0.03% Luperox®11, 0.04% Luperox®70, 0.5% lactic acid, and 0.015% Tinuvin®-770. The example 12 contains 90% MMA, 10% MA, 0.10% stearic acid, 0.03% Luperox®-11, 0.04% Luperox-70, 0.5% lactic acid, and 0.025% Tinuvin®-770. Although HALS is useful together with lactic acid, it could not provide effective protection by itself for the acrylic sample under UVB radiation. The example 13 contains 90% MMA, 10% MA, 0.10% stearic acid, 0.03% Luperox®11, 0.04% Luperox®70, and 0.3% Tinuvin 770 on a weight basis. The examples 14 and 15 contain the same concentrations of monomer and initiator as example 13, except that example 14 contains 0.3% by weight Tinuvin 144 and example 15 contains 0.3% by weight Tinuvin 123. Adding 0.3% Tinuvin 770 to the monomer mixture without any lactic acid did not improve the UV resistance for the acrylic sample, as demonstrated in example 13. The samples made with Tinuvin® 123, Tinuvin® 144, and Tinuvin® 770 as a UV stabilizer showed severe yellowness and loss of UV transmission after Q-UVB exposure. Tinuvin® 770 (CAS No. 52829-07-9), Tinuvin®144 (CAS No. 63843-89-0), and Tinuvin®123 (CAS No. 129757-67-1) are trade names of different hindered amine light stabilizers made by Ciba Special Chemical Corporation and recommended for use in acrylic polymer. They can provide good protection against outdoor weathering but could not provide protection for high intensity UVB radiation. The sample-plaques in examples 13, 14, and 15 lost their UV transmission at 300 nm in a very short time of Q-UVB exposure using HALS as stablilizers. The results are shown in Table 4 below.

TABLE 4

| Q-UVB Exposure | Example 11 | | Example 12 | | Example 13 | | Example 14 | | Example 15 | |
|---|---|---|---|---|---|---|---|---|---|---|
| Transmission at | 300 nm | YI | 300 nm | YI | 300 nm | YI | 300 nm | YI | 300 nm | YI |
| 0 hours | 72% | 0.7 | 72% | 0.7 | 77% | 0.7 | 36% | 0.9 | 66% | 0.6 |
| 200 hours | 77% | 1.7 | 82% | 0.9 | 26% | 6.4 | 2% | 9.4 | 49% | 3.4 |
| 400 hours | 82% | 0.9 | 82% | 1.0 | 19% | 8.8 | 2% | 14.4 | 22% | 8.8 |
| 800 hours | 82% | 1.1 | 81% | 1.5 | 29% | 7.3 | 3% | 14.7 | 28% | 8.9 |
| 1000 hours | 80% | 1.0 | 79% | 1.3 | 34% | 7.0 | 3% | 18.2 | 32% | 8.2 |

Example 16

Example 16 contains the same composition as example 11 except that it contains 0.015% Tinuvin®144 instead of Tinuvin770. The combination of lactic acid and HALS in examples 11, 12, and 16 showed improved resistance to yellowing and loss of UV transmission, compared to the examples 13, 14, and 15 where the HALS was used as the sole UV stabilizer. The examples 13, 14, and 15 failed the Q-UVB accelerated weathering test. Adding Tinuvin 144 also seemed to affect initial UV transmission at 300 nm. The results are shown in Table 5 below.

TABLE 5

| Q-UVB Exposure Transmission at | Example 16 300 nm | YI |
|---|---|---|
| 0 hours | 55% | 0.5 |
| 200 hours | 69% | 1.1 |
| 400 hours | 75% | 0.9 |
| 800 hours | 77% | 1.1 |
| 1000 hours | 79% | 0.9 |

Examples 17-21

Temperature Effect

It was noted that the loss of UV transmission (at 300 nm) and yellowing becomes much more severe for commercial acrylic UV transmission sheet when the temperature reaches above 50° C. during the UVB radiation test. The chamber temperature could reach as high as 60° C. in a short time period because of the heating from the high power UVB lamps. The following table shows the effectiveness of the current invention compared to commercial acrylic sheets when the chamber temperature reaches above 60° C. In this experiment, the chamber temperature of the Q-Panel Accelerated UV Tester is about 60° C. due to the heat generation from eight lamps of UVB-313 type without cooling. Most of the commercial UVT sheets developed severe yellowness and lost their original UV transmission dramatically is at 300 nm after only a few hundred hours of Q-UVB radiation.

Some newer type of high energy tanning lamps such as VHR lamp, could generate considerable amounts of heat. HID (High Intensity Discharge) lamps also present a yellowness problem for acrylic products because of the high intensity light and high temperature. As demonstrated by example 21, the current invention demonstrates almost no change in UV transmission and yellowness after 800 hours of UVB exposure at the same high temperature. The current invention clearly provides a good solution for the applications where high intensity light radiation and high temperature present problems. The results are shown in Table 6 below.

TABLE 6

| Q-UVB Exposure | Ex. 17 Comp. commercial UVT, C1 | | Ex. 18 Comp. commercial UVT, C2 | | Ex. 19 Comp. commercial UVT, C3 | | Ex. 20 Comp. commercial UVT, C4 | | Ex. 21 Invention | |
|---|---|---|---|---|---|---|---|---|---|---|
| Transmission at | 300 nm | YI | 300 nm | YI | 300 nm | YI | 300 nm | YI | 300 nm | YI |
| 0 hours (initial T %) | 87% | 0.5 | 86% | 0.5 | 81% | 0.5 | 84% | 0.5 | 75% | 0.6 |
| 200 hours | 31% | 8.0 | 50% | 3.8 | 9% | 12.0 | 28% | 8.1 | 75% | 0.9 |
| 400 hours | 25% | 10.0 | 45% | 5.3 | 11% | 12.7 | 22% | 10.0 | 78% | 0.8 |
| 600 hours | 22% | 11.0 | 43% | 6.0 | 11% | 12.3 | 28% | 10.0 | 81% | 0.8 |
| 800 hours | 22% | 13.0 | 36% | 7.9 | 13% | 13.1 | 25% | 11.2 | 80% | 0.8 |

Example 22

Commercial Samples

The UV weathering for all of the samples were carried out on a Q-Panel Accelarated Weathering Tester, equipped with eight UVB313EL lamps which were replaced according to the recommended schedule during the length of the weathering study. The calibrated set point for the accelerated weathering tester is 0.67 W/M$^2$ at the wavelength of 313 nm. The chamber temperature of the Q-Panel Weathering Tester is around 45° C. The sample of invention-I was prepared with 1.0% lactic acid as stabilizer, 98.84% methyl methacrylate, 0.03% 2,2 Azobisisobutyronitrile (AIBN), 0.015% Luporox®-11, 0.030% Luporox®-70, and 0.12% stearic acid. The Lab control sample contains the same compositions as the invention-I, except that it contains no lactic acid. The invention-I provided excellent resistance to the Q-UVB radiation and retained its original transmission at 300 nm after 820 hours Q-UVB radiation. The commercial UVT samples that were stabilized with HALS (hindered amine light stabilizers), or other stabilizers could not retain their original UV transmission at 300 nm after 820 hours of Q-UVB exposure. The results are shown in Table 7 below.

The example of the invention clearly demonstrates the effectiveness of lactic acid as a UV stabilizer for an acrylic product.

TABLE 7

Comparisons between commercial UVT sheet and invention sample

| QUVB-hours Transmission % at | Comp. C2 300 nm | Comp. C3 300 nm | Comp. C4 300 nm | Comp. C1 300 nm | Lab Control No stabilizer 300 nm | Invention 300 nm |
|---|---|---|---|---|---|---|
| 0 hrs - initial T % | 83% | 82% | 85% | 85% | 78% | 84% |
| 220 hrs | 65% | 13% | 37% | 37% | 22% | 75% |
| 460 hrs | 62% | 11% | 33% | 35% | 14% | 77% |
| 820 hrs | 50% | 13% | 37% | 36% | 18% | 75% |
| Sample thickness | 0.16" | 0.14" | 0.125" | 0.158" | 0.17" | 0.17" |

Example 23

Example 23 is prepared with the same monomer composition as in the example 3. The monomer mixture of the example 23 was filled into a glass cell and sealed by a PVC spacer that contains phthalate plasticizers. The example 24 was prepared with the same monomer composition as example 3 and sealed by a PVC spacer that has a barrier layer (polyvinyl alcohol) over PVC to prevent it from direct contact with monomer. The example 25 was prepared with the same composition as in the example 3 and sealed by a spacer that has a polymeric plasticizer. The example 26 was prepared with the same monomer composition as the example 3 and sealed by a PVC spacer that coated with Nylon as a barrier layer. The data for these samples is shown in Table 8.

Table 8 contains the examples for the effects of components from processing equipment on the UV deterioration.

TABLE 8

| Q-UVB Exposure Transmission | Example-23 | | Example-24 | | Example-25 | | Example-26 | |
|---|---|---|---|---|---|---|---|---|
| at | 300 nm | YI | 300 nm | YI | 300 nm | YI | 300 nm | YI |
| 0 hours (initial T %) | 76% | 0.6 | 80 | 0.5 | 78% | 0.4 | 78% | 0.4 |
| 190 hours | 5% | 7.5 | 78 | 1.0 | 74% | 1.2 | 74% | 1.0 |
| 400 hours | 6% | 11.0 | 79 | 0.9 | 73% | 0.9 | 80% | 0.8 |

Example-27 was prepared with the same monomer composition as in the example 3 and additional 0.1% dioctyl phthalate. Example-28 was prepared by adding 1.0% calcium carbonate into the monomer mixture as disclosed in the example 3 and shake for 25 minutes. The monomer mixture was filled in to glass cell sealed with a poly vinyl alcohol coated PVC after removing the precipitates. The purpose of this experiment is to evaluate the filler effect from contamination of the process equipment on the UV transmission and retention. Example-29 was prepared in the similar fashion as in the example 28 but the contaminant was 0.5% lead phosphate.

TABLE 9

| Q-UVB Exposure | Example 27 | | Example 28 | | Example 29 | |
|---|---|---|---|---|---|---|
| Transmission at | 300 nm | YI | 300 nm | YI | 300 nm | YI |
| 0 hours (initial T %) | 74% | 0.6 | 56% | 7.2 | 58% | 4.7 |
| 240 hours | 11% | 2.7 | 68% | 7.8 | 76% | 4.3 |
| 410 hours | 11% | 3.3 | 68% | 8.0 | 77% | 4.3 |

What is claimed is:

1. A stabilized high UV transmission acrylic polymer cell cast or continuous cast composition comprising less than 100 ppm total of adipate, alkyl sulfonic ester, mercaptan, phthalate, succinate, and/or sulfonate compounds, wherein said acrylic polymer composition consists essentially of:
    a) 90 to 99.9 percent by weight of an acrylic polymer or copolymer; and
    b) 0.1 to 10 percent by weight of one or more carboxylic acid compounds as a UV stabilizer.

2. A stabilized high UV transmission acrylic polymer composition having a UV transmission deterioration of less than 50%, of its initial UV transmission after 240 hours of Q-UVB exposure when tested in an accelerated decomposition test, said accelerated decomposition test consisting of placing the acrtlic polymer composition inside a Q-Panel Accelerated Weathering tester, model QUV/SE, having UVB313EL lamps, with a set point of 0.67 W/M$^2$ at the calibration wavelength (313 nm) and measuring the UV transmission by a UV/Vis spectrometer before and after the Q-UVB lamp exposures, measuring the YI (yellow index) of these samples by a Machbeth Coloreye Colorimeter according to the ASTM E-313 before and after the Q-UVB exposures, wherein said acrylic polymer composition consists essentially the composition of claim 1 of.

3. A process for producing a cell cast or continuous cast stabilized high UV transmission acrylic polymer having the composition of claim 1 comprising the step of using a spacer selected from the group consisting of a non-PVC plastic, a plasticized PVC core coated with a non-PVC barrier layer, a plasticized PVC plasticized with a polymeric plasticizer, and a PVC plasticized with plastcizers that do not negatively effect UV properties.

4. The stabilized high UV transmission acrylic polymer cell cast or continuous cast composition of claim 1, comprising less than 50 ppm total of adipate, alkyl sulfonic ester, mercaptan, phthalate, succinate, and/or sulfonate compound.

5. The stabilized high UV transmission acrylic polymer cell cast or continuous cast composition of claim 4, comprising less than 10 ppm total of adipate, alkyl sulfonic ester, mercaptan, phthalate, succinate, and/or sulfonate compound.

6. The stabilized high UV transmission acrylic polymer cell cast or continuous cast composition of claim 5, comprising less than 1 ppm total of adipate, alkyl sulfonic ester, mercaptan, phthalate, succinate, and/or sulfonate compound.

7. The stabilized high UV transmission acrylic polymer composition of claim 2 having a UV transmission deterioration of less than 25%.

8. The stabilized high IN transmission acrylic polymer composition of claim 7 having a UV transmission deterioration of less than 15%.

9. The stabilized high UV transmission acrylic polymer composition of claim 8 having a UV transmission deterioration of less than 10%.

10. The stabilized high UV transmission acrylic polymer cell cast or continuous cast composition of claim 1, wherein said carboxylic acid compound comprises an alpha-hydroxy acid or mixtures thereof.

11. The stabilized high UV transmission acrylic polymer composition of claim 2 wherein said carboxylic acid compound comprises an alpha-hydroxy acid or mixtures thereof.

12. The stabilized high UV transmission acrylic polymer cell cast or continuous cast composition of claim 1, wherein said carboxylic acid compound comprises lactic acid, oxalic acid, acetic acid, or a mixture thereof.

13. The stabilized high UV transmission acrylic polymer composition of claim 2 wherein said carboxylic acid compound comprises lactic acid, oxalic acid, acetic acid, or a mixture thereof.

14. The stabilized high UV transmission acrylic polymer cell cast or continuous cast composition of claim 1, wherein said acrylic copolymer comprises from 85-95 percent by weight of methacrylic acid monomer units and from 5 to 15 percent by weight of methyl acrylate monomer units.

15. The stabilized high UV transmission acrylic polymer composition of claim 2 wherein said acrylic copolymer comprises from 85-95 percent by weight of methacrylic acid monomer units and from 5 to 15 percent by weight of methyl acrylate monomer units.

16. The stabilized high UV transmission acrylic polymer cell cast or continuous cast composition of claim 1, wherein said acrylic polymer composition of claim 1 further comprising from 0.01 to 2.0 percent by weight of HALS, based on the total weight of acrylic polymer.

17. The stabilized high UV transmission acrylic polymer composition of claim 2 wherein said acrylic polymer composition of claim 1 further comprising from 0.01 to 2.0 percent by weight of HALS, based on the total weight of acrylic polymer.

18. The stabilized high UV transmission acrylic polymer cell cast or continuous cast composition of claim 1, wherein said composition comprises a tanning bed; a greenhouse; a shelter in which plants including grass are grown; an animal shelter; an LCD display; a data, video or audio acrylic storage media; a terrarium or aquarium; optical fiber; a device that allows passage of UV energy for subsequent conversion to other wavelength energy; or a device or system in which UV energy is used to heat, cure or react components.

19. The stabilized high UV transmission acrylic polymer composition of claim 2 wherein said acrylic polymer composition comprises a tanning bed; a greenhouse; a shelter in which plants including grass are grown; an animal shelter; an LCD display; a data, video or audio acrylic storage media; a terrarium or aquarium; optical fiber; a device that allows passage of UV energy for subsequent conversion to other wavelength energy; or a device or system in which UV energy is used to heat, cure or react components.

\* \* \* \* \*